Nov. 5, 1946.　　　　　R. P. KROON　　　　　2,410,450
TURBINE APPARATUS
Filed Jan. 30, 1943　　　　　2 Sheets-Sheet 1

INVENTOR
REINOUT P. KROON.
BY
ATTORNEY

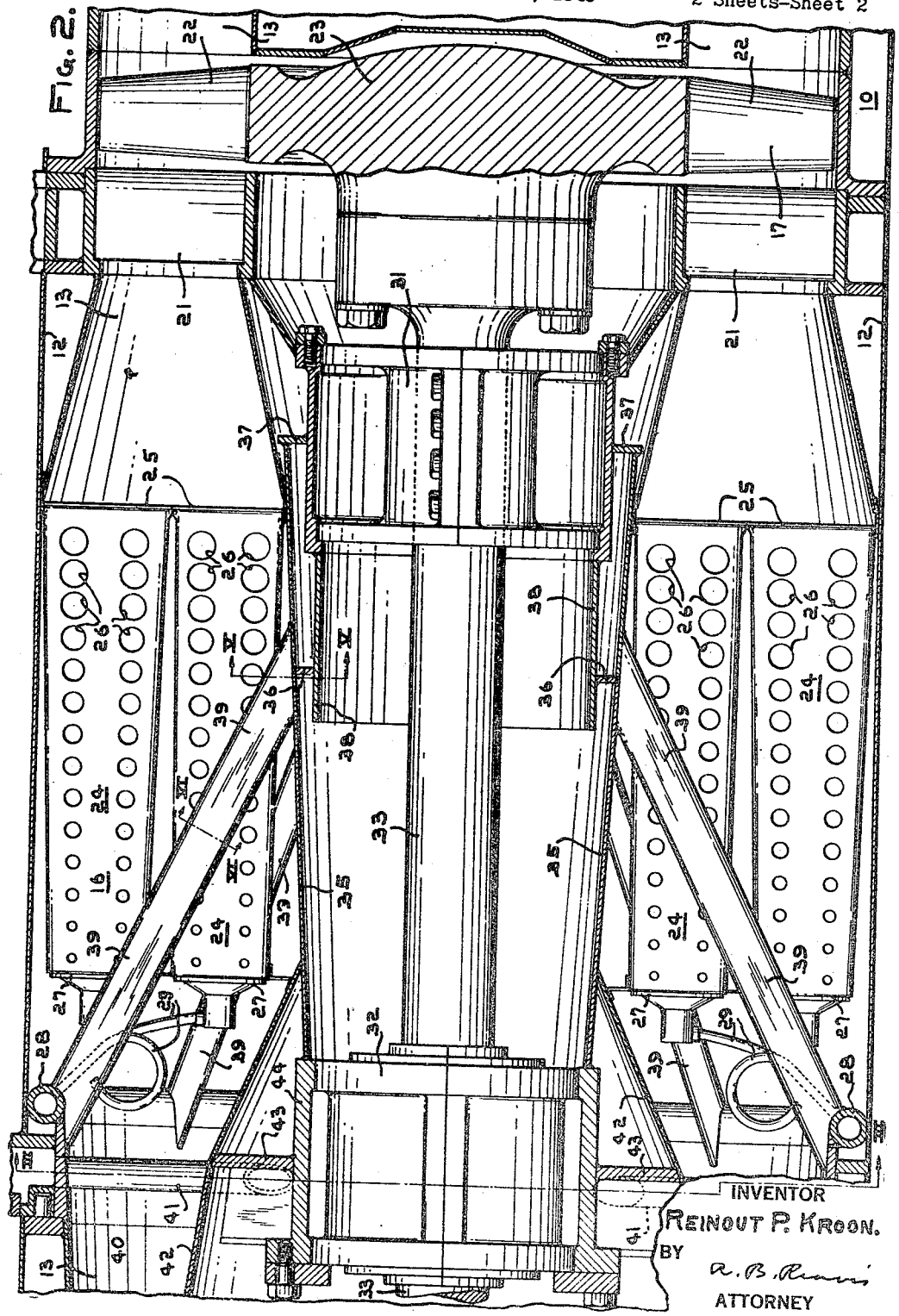

Patented Nov. 5, 1946

2,410,450

UNITED STATES PATENT OFFICE 2,410,450

TURBINE APPARATUS

Reinout P. Kroon, Swarthmore, Pa., assignor to Westinghouse Electric Corporation, East Pittsburgh, Pa., a corporation of Pennsylvania Application January 30, 1943, Serial No. 474,093

5 Claims. (Cl. 60—41)

This invention relates to power plants and particularly to the construction of a gas turbine power plant which may be used to effect propulsion of aircraft at high speeds, and it has for an object to provide an improved bearing construction for a device of the character set forth.

In order to propel aircraft at high speeds, it has been proposed to employ a power plant functioning on the nonregenerative Joule cycle. Such a power plant may include an air compressor, a combustion apparatus, and a gas turbine compactly arranged in series to keep the weight, overall length, and diameter of the unit at a minimum. These parts are mounted centrally within and supported by an outer casing of streamline form which directs the flow of air through the power plant.

The turbine is driven by the hot gases provided by the compressor and combustion apparatus and extracts at least sufficient power from these gases to drive the compressor. The remainder of the available power may be utilized to propel the aircraft by ejecting the air from a propulsion jet rearwardly of the turbine.

The turbine and compressor rotors are preferably carried on a common shaft which is supported by two or more bearings rigidly connected to the outer casing. The supports for the bearings nearest the turbine rotor are located within the region of the combustion apparatus and consequently are subjected to temperature changes.

It is an object of the present invention to provide an improved bearing supporting structure for use in regions subjected to temperature variations, which prevents dangerous stresses from being exerted on the bearing or bearings due to variation in the temperature of the supporting structure.

It is another object of the invention to provide an improved power plant employing a combustion apparatus and means for supplying air to such apparatus in which the air is caused to flow over supporting structure adjacent the combustion apparatus for cooling the supporting structure.

These and other objects are effected by the invention as will be apparent from the following description and claims taken in connection with the accompanying drawings, forming a part of this application, in which:

Fig. 2 is a longitudinal sectional view of a portion of the power plant shown in Fig. 1, the portion illustrated corresponding substantially to the bracketed part II of Fig. 1;

Figure 1:
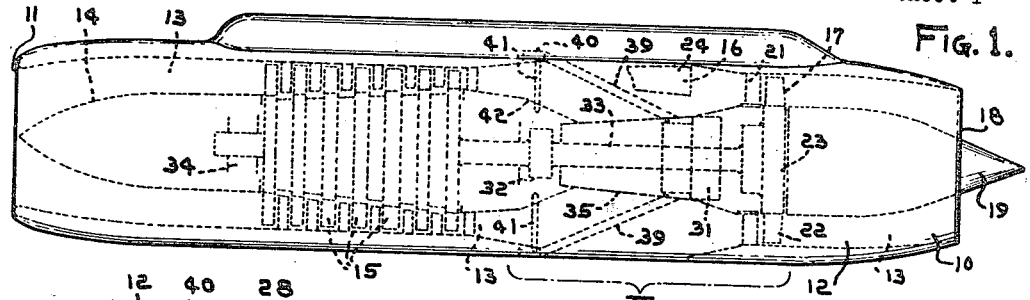
Fig. 1 is a side elevational view of a power plant in which the present invention has been incorporated.

The power plant shown in Fig. 1 and generally indicated 10 is adapted to be mounted in or on the fuselage or wings of an airplane, with the left or intake end 11, as viewed in this figure, pointed in the direction of flight. The power plant comprises an outer shell or casing structure 12 providing an air duct 13 extending fore and aft with respect to the aircraft. This casing has mounted therein along its longitudinal axis a nose portion 14 in which fuel and lubricating oil pumps and ignition apparatus may be supported, an axial flow air compressor 15, a combustion apparatus 16, a turbine 17, and a propulsion jet 18 defined by the casing and a tailpiece 19. Air enters at the intake end 11, flows through the compressor 15 where it is compressed, and into the combustion apparatus 16 where it is heated. The hot gases on leaving the combustion apparatus are directed by suitable guide vanes or nozzles 21 against the blades 22 of the turbine rotor 23 and then discharged through the propulsion jet 18.

Figures 3, 6:
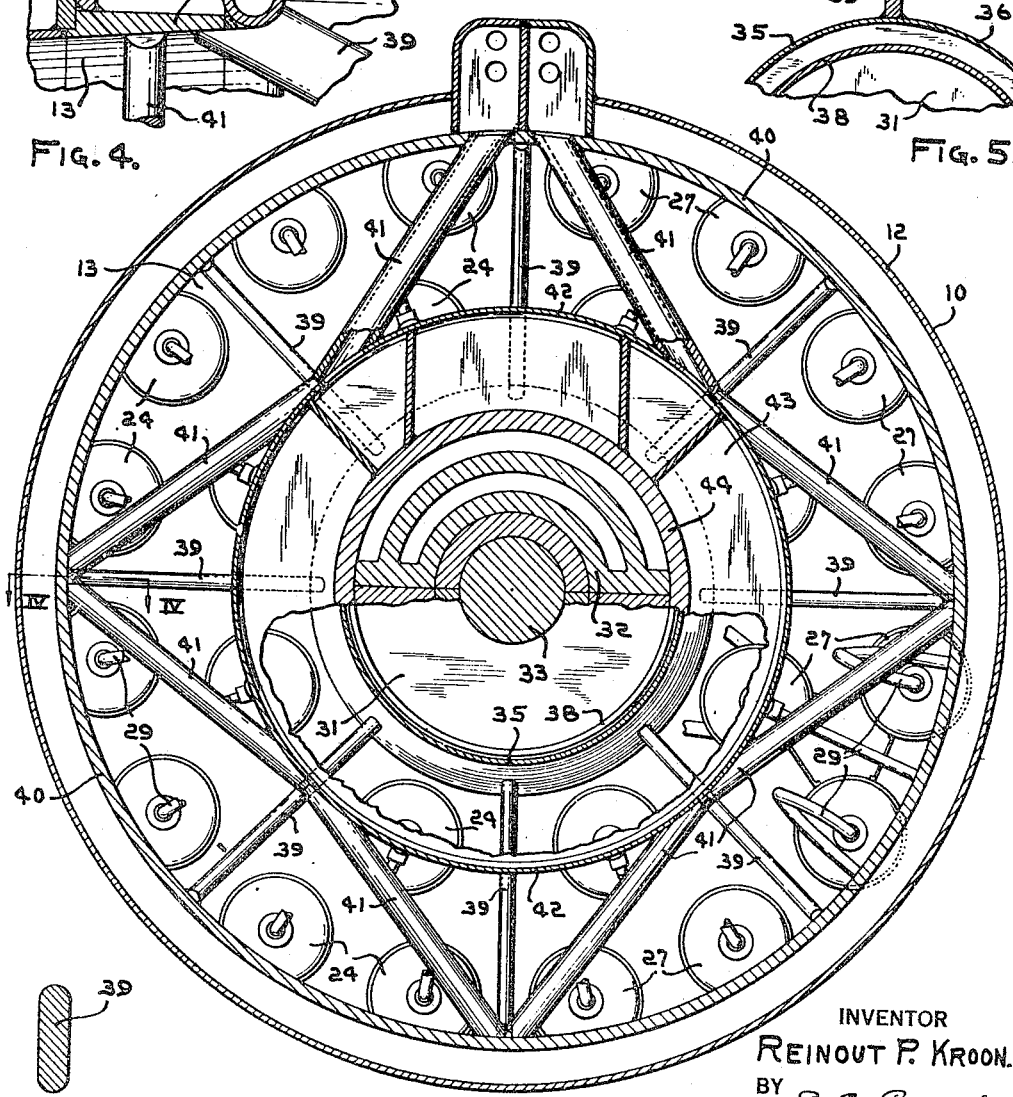
Fig. 3 is a transverse section taken substantially on the line III—III of Fig. 2.
Fig. 6 is a sectional view taken substantially on the line VI—VI of Fig. 2.

The combustion apparatus 16 may be of any preferred type and is shown as comprising a plurality of flared burner tubes 24 arranged circularly, as shown in Fig. 3. Each tube is open at the large end 25 and has a plurality of openings 26 through which the air from the compressor enters and mixes with fuel supplied at the smaller closed end 27 of the burner tube. The fuel, which is preferably a suitable oil, is supplied to the burner tubes from a suitable tank and pump (not shown) by means of a distributor pipe 28 and branch pipes 29 individual to each burner. A suitable ignition means (not shown) may be provided for each burner.

The present invention is not limited to the details or arrangement of the structure thus far described, but is primarily concerned with the manner of supporting bearings 31 and 32 which support a shaft 33 connecting the turbine rotor 23 with the rotor of compressor 15. This shaft may also be provided with a third bearing 34. The bearing 32 is preferably a combined doublethrust and radial bearing of any suitable construction.

The bearings 31 and 32 are located in the region of the hot combustion chambers and it is, therefore, not feasible to support them by means of conventional spiders or struts extending radially, at right angles to the shaft axis, since the wide temperature variations of such struts would result in damaging stresses being exerted on the bearings.

In the embodiment of the invention shown in the drawings, the shaft 33 is surrounded by an inner casing 35 welded or otherwise secured to the bearings 31 and 32 and which, together with the outer casing 12, defines an annular space in which the burner tubes 24 are located. The casing 35 encloses the shaft 33 and protects it from the high temperature at the burners 24. The bearing 31 is connected to this inner casing 35 by means of a pair of rings 36 and 37, which may be welded to the inner casing. The ring 36 is preferably secured to an extension sleeve 38 welded or otherwise secured to the bearing 31.

Figures 4, 5:
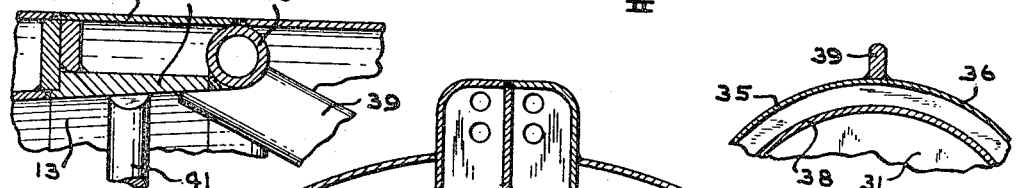
Fig. 4 is an enlarged sectional view taken substantially on the line IV—IV of Fig. 3.
Fig. 5 is a sectional view taken substantially on the line V—V of Fig. 2.

The inner casing 35 and the bearing 31 carried thereby are supported from the outer casing 12 by means of a plurality of spaced struts 39 which extend forwardly toward the intake end of the power plant and are inclined at an acute angle to the axis of the shaft 33. These struts are secured, as by welding, to the inner casing 35, preferably at the circumferential zone where the ring 36 connects the extension sleeve 38 to the inner casing. The forward or outer end of each strut is secured to the outer casing 12 at a circumferential zone displaced from the bearing 31 axially with respect to the shaft 33. As shown in Figs. 3 and 4, the struts 39 are secured, as by welding, to a suitable bulkhead or annular reinforcing ring structure, generally indicated 40, built into the casing 12 and which also serves to support the fuel distributor pipe 28 as well as to strengthen the outer casing. This bulkhead also serves to support the second bearing 32, the bearing being connected thereto by means of struts 41 referred to in detail hereinafter.

By reference to Fig. 2, it will be noted that the combustion chambers 24 flare outwardly toward the rear end of the power plant, providing a space between the walls of adjacent burners in which the struts are located. By positioning the struts in these spaces, they are at all times exposed to the flow of the relatively cool air from the compressor before it enters the burners, the air serving to maintain the struts cool even though located closely adjacent the hot burners.

While the temperature of the struts 39 changes even though cooled by the air flowing around them, the air does have the effect of keeping the temperature of the struts below a safe maximum. Further, by arranging these struts at an acute angle to the axis of the shaft 32, elongation and contraction of the struts due to temperature changes thereof results in a slight axial movement of the bearing 31 without exerting any dangerous or excessive compressive or tensile stresses on the bearing.

The struts 41 are arranged in a star-shaped pattern, as shown particularly in Fig. 3, and serve to support the bearing 32 as well as the forward end of the inner casing 35 and a second inner casing 42. The casing 42 is in effect a continuation of the casing 35 and defines with the outer casing 12 the annular air passage 13. The bearing is supported by the second casing 42 by means of a ring 43 which is secured thereto, as by welding, and to an annular member 44, in which the bearing is housed.

The struts 41 extend substantially tangentially to the inner casing 42, permitting the struts as well as the casing and the parts supported therein to expand and contract without setting up dangerous compressive or tensile stresses in the structure. Instead, the struts tend to bend or flex. Further, by arranging the struts 41 in this manner, they are substantially longer than conventional radial struts and consequently are more flexible to permit such bending without danger of permanently deforming the struts.

If desired, the two upper struts 41, visible in Fig. 1, may be tubular to provide inlet and outlet pipes for supplying lubricating oil to the bearings.

From the above description, it is clear that there has been provided an efficient and light supporting structure in which the parts carried by the outer casing are free to expand and contract within certain limits without creating harmful or dangerous stresses between connected parts. Thus the inclined struts 39 and the tangential struts 41 serve to steady the bearings 31 and 32 and the inner casing structure 35 and 42. Radial loads exerted on the bearing 32 are transmitted to the ring 43 and from here through the struts 41 to the bulkhead 40. Radial loads on bearing 31 are carried by the struts 39 which are stressed in tension and compression. Thrust loads exerted on the bearing 32 are transmitted by the inner casing structure 35 to the struts 39 and hence to the bulkhead 40. It is thus seen that all loads are carried by tension and compression members, thus permitting a light structure.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. A gas turbine comprising a casing, a shaft journaled within said casing, a turbine rotor carried by said shaft, a heating chamber formed within said casing adjacent said rotor and arranged to discharge motive fluid heated therein to said rotor for driving the same, a pair of spaced bearings disposed within said casing in the vicinity of said heating chamber for supporting said shaft, and bearing supporting means connected to each of said bearings, the bearing supporting means of each bearing being connected to said casing closely adjacent one another, the bearing supporting means for one of said bearings extending at an acute angle to the axis of said shaft, the bearing supporting means for the other bearing being disposed at substantially right angles to said shaft and substantially tangential to its bearing housing.

2. A gas turbine like that set forth in claim 1 in which said bearing supporting means comprise elongated spaced struts arranged circularly about said shaft.

3. A gas turbine like that set forth in claim 1 and further including a rigid tubular structure enclosing said shaft between said spaced bearings and rigidly connected thereto.

4. A gas turbine comprising a casing, a shaft journaled within said casing, a turbine rotor carried by said shaft, combustion apparatus including a plurality of spaced burner tubes arranged circularly within said casing around said shaft and having open ends for discharging products of combustion to said rotor for driving the same, a blower driven by said turbine rotor for supplying air to said burner tubes, a bearing for said shaft located adjacent said rotor, spaced struts connected to said bearing and extending at an acute angle to the axis of said shaft and connected to said casing at a circumferential zone displaced axially with respect to said bearing, said struts being disposed between and spaced from adjacent burner tubes and in the path of air flowing from said blower to said burner tubes for cooling said struts.

5. A gas turbine like that set forth in claim 4 and further including a second bearing for said shaft spaced from said first-mentioned bearing, struts connected to said second bearing and to said casing at said circumferential zone, and a rigid tubular structure enclosing said shaft between said spaced bearings and secured to said bearings.

REINOUT P. KROON.